H. C. KEPHART & J. P. MILLER.
COMBINED INSURANCE CONTRACT AND HOTEL GUEST RECEIPT.
APPLICATION FILED APR. 6, 1916.

1,204,455.

Patented Nov. 14, 1916.

ced certain new and useful Improvements in

UNITED STATES PATENT OFFICE.

HARRY C. KEPHART AND JAMES P. MILLER, OF DENVER, COLORADO.

COMBINED INSURANCE-CONTRACT AND HOTEL-GUEST RECEIPT.

1,204,455.

Specification of Letters Patent. Patented Nov. 14, 1916.

Application filed April 6, 1916. Serial No. 89,332.

*To all whom it may concern:*

Be it known that we, HARRY C. KEPHART and JAMES P. MILLER, citizens of the United States, residing at the city and county of Denver and State of Colorado, have invented certain new and useful Improvements in a Combined Insurance-Contract and Hotel-Guest Receipt; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to a combined receipt for money paid and an insurance contract or policy, the document comprising on one side a part adapted to be properly filled in to constitute a receipt, the same side of the document also containing a statement that a certain insurance company in consideration of the receipted bill or statement will insure the person to whom the receipt is given subject to the conditions named in the policy or contract on the reverse side of the document, the said policy being of any suitable form but arranged to have the name of the person to whom the receipt is given specified therein as well as the amount for which the receipt is given, the latter serving as the premium for the policy, the period for which the insurance is given, depending upon the amount specified in the receipt. Our improved instrument also contains a number of detachable coupons which constitute records for the party writing the policy; the local agency from which the policy is obtained; and the home office of the insurance company. In addition to this the instrument also contains spaces properly designated for the making of a record which corresponds to the record on the removable coupons heretofore specified so far as the number of the policy, the number of the agency, the date of issue and the time of issue, are concerned.

The use which we have more particularly in mind in producing this instrument, is to enable hotel proprietors to issue to their guests for periods limited as they may think proper, insurance policies as the guests pay their bills, the receipt for the amount paid being made out on the said instrument as heretofore indicated, and a permanent record on the instrument, together with the policy, to be prepared with special reference to the particular guest to whom the receipt is given; and the amount paid by him, as well as the date and hour of issue. It is believed that an instrument of this character will be advantageous to hotel proprietors as forming an inducement to guests to stop where these policies are known to be issued, while at the same time it will be advantageous to their guests and more particularly to those whose business requires considerable traveling.

Having briefly outlined our improvement, we will proceed to describe the same in detail, reference being made to the accompanying drawing, in which is illustrated an embodiment thereof.

The drawing is a face view of our improved instrument showing the same filled out in the name of John Doe who has been given a receipt for a bill by the Brown Hotel Company of Denver, Colorado. This receipt is located at the upper right-hand corner of the instrument, this part of the latter being designated by the numeral 5 which is placed directly above the receipt portion. The central part 6 of the instrument is provided with a blank 7 which may be used by the hotel for advertising purposes, being well adapted to contain a picture of the building or other such advertising matter as the proprietor may choose. Below this part 7 and arranged in a space designated by the numeral 8, is a statement to the effect that The Hotel Mutual Accident Insurance Company of Denver, Colorado, where it is assumed that the home office is located, in consideration of the receipted bill 5, insures the person whose name is mentioned therein subject to the conditions on the reverse side of the instrument, which contains a policy of ordinary form and which it is not thought necessary to illustrate in the drawing.

The upper left-hand corner of the instrument contains three detachable coupons designated by the numerals 9, 10 and 11, respectively, these coupons being exactly alike except as to their headings which are Hotel record, Agency record, and Home office record, respectively. Each coupon when prepared as shown in the drawing to correspond with the receipted bill, contains the name of the guest, the location of the hotel, the number of the policy, the number of the agency, the date of issue, the hour of issue, and the period for which the policy is issued. As shown in the drawing, the number of the policy is 1548; the number of the agency 151; the date of issue March 15, 1916; the hour of issue 6 a. m., while the period or term of the policy is 24 hours. These coupons should be separated from each other by perforated lines while there should be a row of perforations between the coupon 11 and the adjacent portion of the body of the instrument which is to be retained by the guest and consisting of the part 8, a record part 12 and a small portion of the advertising part 7 which is directly above the part 12. Of course, any suitable provision may be made with reference to the coupons 9, 10 and 11 to facilitate their ready removal from the body of the instrument. The record part 12 is a duplicate of any one of the coupons 9, 10 and 11 so far as the number of the policy, the number of the agency, the date of issue, the hour of issue and the term or period of the policy, are concerned. In fact, this part 12 contains the same data as a coupon 9, 10 or 11 except the name of the guest or beneficiary of the policy, and the location of the hotel, which, of course, is not necessary on the part 12 as it is already included in the portion of the instrument which the guest receives.

The manner or system of handling our combined insurance contract and hotel-guest receipt, will be readily understood. As soon as the guest is ready to leave the hotel and goes to pay his bill, our improved instrument will be produced and the receipt will be prepared on the part 5 thereof in the usual manner and as indicated on the drawing. The coupons 9, 10 and 11 will then be filled out by placing therein the name of the guest, John Doe; the location of the hotel, Denver, Colorado; the register number of the policy, 1548; the number of the local agency from which the policy is obtained, namely, 151; the date of issue of the policy, March 15, 1916; the hour of issue, 6 a. m.; and the term or period for which the policy is issued, namely, 24 hours. Of course, the data just mentioned will vary according to circumstances, the same being indicated in the drawing for purposes of illustration only, but which will serve as a guide in using the instrument under all circumstances. The part 12 will also be prepared and will show the register number of the policy; the number of the local agency; the date of issue; the hour of issue; and the period or term of the policy, the same as heretofore stated when referring to the coupons 9, 10 and 11. The policy (not shown) on the reverse side, will, of course, be filled out or prepared in the ordinary way, but always with reference to the data contained in the receipted bill so far as the name of the policy holder and the amount paid by him as indicated in the receipt, are concerned. The policy on the reverse side will, of course, contain data corresponding with that on the parts 9, 10, 11 and 12 of the instrument.

Having thus described our invention, what we claim is,—

1. An instrument of the class described, including a form for an insurance policy on one side, the reverse side including a form for a receipt, a statement referring to the receipt as a consideration for the policy, and a coupon form in triplicate, each part containing indicia to indicate its ultimate use or destination after removal, and blanks to receive other data.

2. An instrument of the class described, including a form for an insurance policy, a form for a receipt, a statement referring to the receipt as a consideration for the policy, a form adapted to contain a brief record of the policy giving its number, its date, the hour of issue and its term, and a coupon form in triplicate, each part containing indicia to indicate its ultimate use or destination after removal, and other characteristic indicia adapted to be employed as a guide for the introduction of data, including the name of the insured, the location where the policy is issued, the number of the policy, the number of the local agency, the date of issue, the hour of issue, and the duration of the policy.

In testimony whereof we affix our signatures, in presence of two witnesses.

HARRY C. KEPHART.
JAMES P. MILLER.

Witnesses:
GRACE HUSTON,
A. EBERT O'BRIEN.